Figure 1:
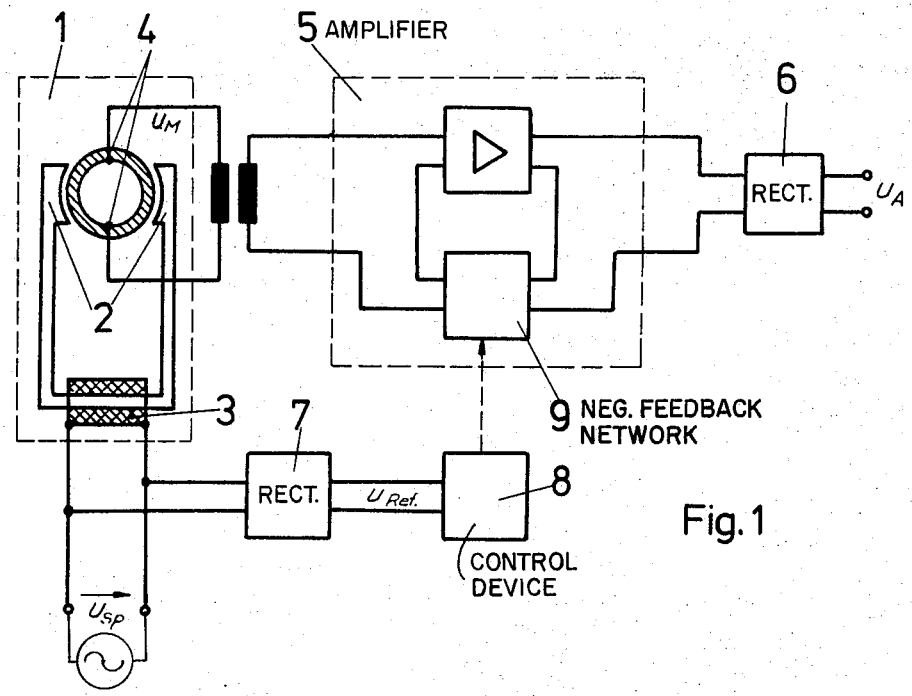

United States Patent [19]
DiMarco

[11] 3,764,895
[45] Oct. 9, 1973

[54] APPARATUS FOR COMPENSATING AN INDUCTION FLOW METER FOR FLUCTUATIONS IN THE A.C. SUPPLY VOLTAGE

[75] Inventor: Franco P. DiMarco, Stuttgart-Bad Cannstatt, Germany

[73] Assignee: J. C. Eckardt AG, Stuttgart-Bad Cannstatt, Germany

[22] Filed: Apr. 22, 1971

[21] Appl. No.: 136,400

[30] Foreign Application Priority Data
Apr. 23, 1970 Germany .................. P 20 19 613.8

[52] U.S. Cl. .................. 324/34 FL, 73/194 EM
[51] Int. Cl. .............................................. G01r 33/00
[58] Field of Search .................. 324/34 FL; 73/194 EM

[56] References Cited
UNITED STATES PATENTS
2,887,878  5/1959  Ramp et al. .................. 324/34 FL
2,757,538  8/1956  Soffel .......................... 73/194 EM
3,094,870  6/1963  Mittlemann .................. 73/194 EM Primary Examiner—Robert J. Corcoran
Attorney—Craig, Antonelli & Hill

[57] ABSTRACT

A circuit for compensating for the fluctuations of an a.c. line voltage on the measurement signal of a measurement pick-up element fed with the a.c. line voltage, in which an amplifier is connected in the output of the primary pick-up element whose amplification factor is changed inversely proportional to the influence of the a.c. line voltage fluctuations on the signal produced by the primary pick-up element wherein the amplifier is provided with a negative feedback circuit including a variable resistor which is controlled in response to a reference signal dependent on the AC supply voltage as well as by a constant auxiliary signal applied directly to the variable resistor so that the value of this resistor is controlled as a function of the difference between the auxiliary signal and the reference signal.

2 Claims, 2 Drawing Figures

PATENTED OCT 9 1973    3,764,895

INVENTOR

FRANCO P. DI MARCO

BY Craig, Antonelli, Stewart & Hill
ATTORNEY

APPARATUS FOR COMPENSATING AN INDUCTION FLOW METER FOR FLUCTUATIONS IN THE A.C. SUPPLY VOLTAGE

The present invention relates to a circuit for the compensation of the (multiplicative) influence of the fluctuations of the a.c. line voltage, especially of a magnetic-inductive flow meter which has an amplifier connected in its output.

A compensation circuit is already known in the prior art in which with the aid of a measuring bridge consisting of controllable resistances that are fed from a d.c.—and a.c.—voltage, the a.c. supply voltage changes with the amplitude of the a.c. line voltage. However, the expenditures as regards circuitry are very great in such prior art device.

The present invention is concerned with the task to avoid the circuit expenditures, and to provide with few means an operationally reliable compensation circuit that can be utilized generally for line-fed or mains-powered a.c. primary pick-up elements or a.c. measurement transmitter elements, especially, however, for magnetic-inductive flow meters with an amplifier connected in the output thereof.

According to the present invention, an installation is provided which changes the amplification factor inversely proportional to the influence of the fluctuations of the a.c. line voltage on the measurement signal produced by the primary pick-up or transmitter. Furthermore, provision is made to form a reference voltage $U_{ref}$ from the current which feeds the transmitter or primary pick-up element, and that this reference voltage which contains the line voltage fluctuations to the same extent as the measurement voltage $U_M$ produced by the primary pick-up or transmitter, changes the amplification factor inversely proportionally to the fluctuatons of the a.c. line voltage. For that purpose, a controllable resistance which changes corresponding to the reference voltage, is arranged in the negative feedback circuit of the amplifier.

Figure 2:
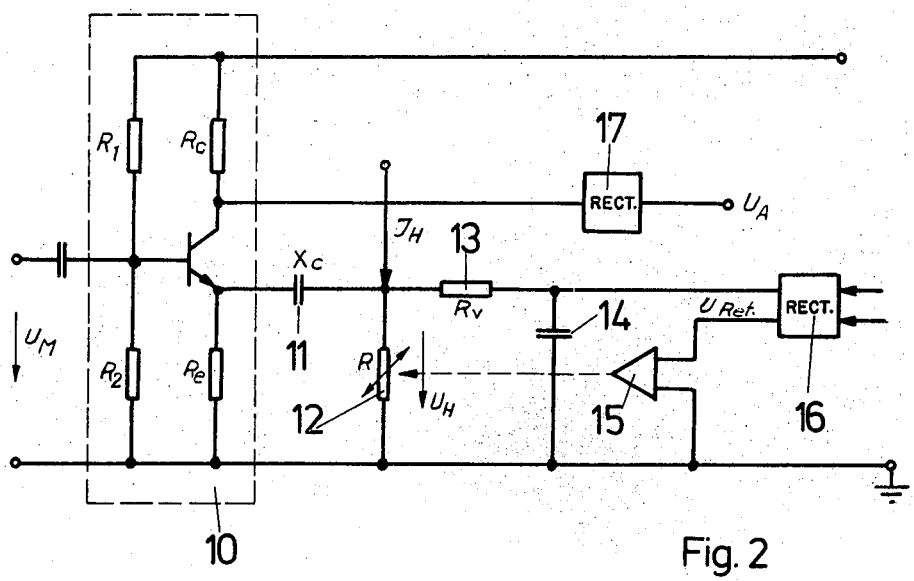

These and further objects, features and advantages of the present invention will become more obvious from the following description when taken in connection with the accompanying drawing which shows, for purposes of illustration only, one embodiment in accordance with the present invention, and wherein:

FIG. 1 is a schematic block diagram indicating the principle of the present invention; and FIG. 2 is a circuit diagram illustrating one embodiment for a magnetic-inductive flow meter in accordance with the present invention.

The measurement voltage $U_M$ produced by the primary pick-up or transmitter element 1 is proportional to the flow $Q$ and to the induction B. If the measurement voltage is amplified by the amplifier by a factor of $V$, then the following equation is true if the output voltage of the amplifier is designated by $U_A$:

$$U_A = Q \cdot B \cdot V \quad (1)$$

The line voltage fluctuations express themselves in corresponding fluctuations of the magnetic induction B. This is to be taken into consideration by the factor $\lambda$ so that one can write the expression for B as follows:

$$B = \lambda \cdot B_o \quad (2)$$

The factor "$\lambda$" is thereby not constant but instead a magnitude which reproduces the non-uniform changes of the a.c. line voltage. The effect of the compensation, if one changes the amplification factor $V$ inversely proportional as a function of this "statistical factor $\lambda$," then becomes $$U'_A = Q \cdot \lambda \cdot B_0 \cdot V_o \quad (3)$$

whereby $U'_A$ is now a measure for the flow $Q$ independently of the fluctuations of the a.c. line voltage. With other types of a.c. powered measurement transmitter or primary pick-up elements, another physical magnitude exists in the place of the flow $Q$.

Referring now to the drawing, wherein like reference numerals are used throughout the two views to designate corresponding parts, and more particularly to FIG. 1, the magnets 2 of the magnetic-inductive flow meter 1 of conventional construction are energized by the winding 3 fed directly from the a.c. line voltage. In addition to an interference voltage of no interest, the measurement voltage $U_M$ results at the electrodes 4, which is fed to the input circuit of the amplifier 5. An average value is formed by the rectifier 7 from the a.c. line voltage $U_{sp}$ as reference voltage $U_{Ref}$. This reference voltage $U_{Ref}$ changes with the fluctuations of the a.c. line voltage to the same extent as the measurement voltage $U_M$. The reference voltage, however, could also be derived directly from the transmitter or pick-up magnets.

The reference voltage $U_{Ref}$ acts by way of the control device 8 of any known construction on the negative feedback network 9 of the amplifier 5 in such a manner that with increasing reference voltage, the negative feedback is increased and therewith the amplification of the amplifier 5 decreases.

FIG. 2 illustrates one embodiment in accordance with the present invention.

The measurement voltage $U_M$ is fed to the transistor amplifier 10 by way of a capacitor. The resistances $R_1$ and $R_2$ serve in a conventional manner as a voltage divider. The amplified signal can be picked up at the collector by way of the average value rectifier 17 of conventional construction. A network is connected in parallel with the emitter resistance $R_e$ which consists of the capacitor 11, the controllable resistance R 12 and and the comparison resistance $R_v$ 13. The comparison resistance $R_v$ is connected ground by way of the capacitor 14, insofar as the a.c. voltage is concerned.

If, in the network $$R_v > R$$

then the following equation is true for the impedance Z of this arrangement:

$$Z = R_e (R + X_c)/R_e + R + X_c$$

where $$X_c = 1/iwC$$

If the capacitance of the capacitor 11 is selected sufficiently large and, if $R_e > R$, then $$Z = R$$

The following then is true for the amplification $V$:

$$V = R_c/R$$

The constant auxiliary current $I_H$ flows through the variable controllable resistance R 12, also called at times an electronic potentiometer of known construction, and produces the auxiliary voltage $U_H$ which is also constant.

The reference voltage $U_{Ref}$ is formed by the rectifier 16 by appropriate averaging either from the line voltage $U_{sp}$ directly or from the pick-up magnets 2. The auxiliary voltage $U_H$ is compared with the reference voltage $U_{Ref}$ in the differential amplifier 15. The differential amplifier, in case of deviations from a nominal value which result from the variable magnitude of the reference voltage, controls the variable controllable resistance R 12 by conventional means in such a manner that the negative feedback of the amplifier 10 is increased with increasing reference voltage and therewith the amplification factor changes inversely proportional. The output voltage $U_A$ therefore will reflect only the actual value of interest of the pick-up or transmitter element, independently of the a.c. line voltage fluctuations.

While I have shown and described only one embodiment in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

I claim:

1. In an induction flow meter including an A.C. supply voltage source connected to field generating means and a primary pickup element, a main amplifier connected to the output of said primary pickup element and having a negative feedback path which includes a variable resistor, and means for varying the resistance value of said resistor in response to a reference voltage signal dependent on the A.C. supply voltage, the improvement consisting of a circuit arrangement for compensating for the effect of fluctuations in the A.C. supply voltage comprising means for feeding a constant auxiliary current to the variable resistor to produce an auxiliary voltage at this resistor, said means for varying said variable resistor including a differential amplifier to whose inputs are fed the auxiliary voltage and said reference voltage which is approximately proportional to the amplitude of the A.C. supply voltage and whose output is applied in control of said variable resistor, so that the value of the variable resistor is controlled as a function of the difference between the auxiliary voltage and said reference voltage.

2. Circuit arrangement according to claim 1, wherein said variable resistor is connected in series connection with a capacitor across an emitter resistor of a transistor serving as said main amplifier, wherein the constant auxiliary current is isolated from the emitter circuit of the transistor by said capacitor.

* * * * *